United States Patent
Boyd

(10) Patent No.: US 9,413,466 B2
(45) Date of Patent: Aug. 9, 2016

(54) DISTRIBUTED PON TRANSCEIVER ARCHITECTURE

(71) Applicant: Tibit Communications, Inc., Petaluma, CA (US)

(72) Inventor: Edward W. Boyd, Petaluma, CA (US)

(73) Assignee: TIBIT COMMUNICATIONS, INC., Petaluma, CA (US)

( * ) Notice: Subject to any disclaimer, the term of this patent is extended or adjusted under 35 U.S.C. 154(b) by 0 days.

(21) Appl. No.: 14/684,215

(22) Filed: Apr. 10, 2015

(65) Prior Publication Data

US 2015/0311997 A1    Oct. 29, 2015

Related U.S. Application Data

(60) Provisional application No. 61/978,146, filed on Apr. 10, 2014.

(51) Int. Cl.
| | |
|---|---|
| *H04J 14/00* | (2006.01) |
| *H04B 10/40* | (2013.01) |
| *H04J 14/02* | (2006.01) |
| *H04Q 11/00* | (2006.01) |

(52) U.S. Cl.
CPC ............ *H04B 10/40* (2013.01); *H04J 14/0239* (2013.01); *H04Q 11/0067* (2013.01); *H04J 14/0245* (2013.01)

(58) Field of Classification Search
CPC .............. H04J 14/0239; H04J 14/0242; H04J 14/0243; H04J 14/0245; H04J 14/0246; H04J 14/0249; H04J 14/025; H04J 14/0252; H04J 14/0254; H04Q 11/0067; H04B 10/40
See application file for complete search history.

(56) References Cited

U.S. PATENT DOCUMENTS

| | | | | |
|---|---|---|---|---|
| 8,139,950 B2* | 3/2012 | Niibe | ................. | H04Q 11/0067 398/100 |
| 8,526,815 B2* | 9/2013 | Adler | ................. | H04Q 11/0067 370/235 |
| 8,600,234 B2* | 12/2013 | Hirth | ................... | H04J 14/0282 398/58 |
| 8,687,976 B1* | 4/2014 | Sindhu | ................... | H04B 10/27 398/168 |
| 9,020,342 B2* | 4/2015 | Sarashina | ........... | H04J 14/0246 398/135 |

* cited by examiner

*Primary Examiner* — M. R. Sedighian
(74) *Attorney, Agent, or Firm* — Shun Yao; Park, Vaughan, Fleming & Dowler LLP

(57) ABSTRACT

One embodiment provides an optical line terminal (OLT) module in a network device. The OLT module includes an optical signal module, an OLT management module, a scheduler module, and a forwarding module. The optical signal module transmits optical signals to and receives optical signals from a number of optical network units (ONUs). During operation, the OLT management module identifies a remote OLT module operating at a lower upstream data rate than the OLT module. The scheduler module identifies a report message received from a first ONU operating at the lower upstream data rate and generates a grant corresponding to the report message. A grant specifies a time slot for an upstream data burst. The scheduler module includes the grant in a notification frame destined for the remote OLT module. The forwarding module forwards the notification frame to an internal switch of the network device.

21 Claims, 11 Drawing Sheets

US 9,413,466 B2

DISTRIBUTED PON TRANSCEIVER ARCHITECTURE

RELATED APPLICATION

This application hereby claims priority under 35 U.S.C. §119 to U.S. Provisional Patent Application No. 61/978,146, filed on 10 Apr. 2014, entitled "Distributed PON Transceiver Architecture," by inventor Edward W. Boyd.

BACKGROUND

1. Field

The present disclosure relates to the design of a passive optical network (PON). More specifically, the present disclosure relates to the design of a distributed architecture for a PON.

2. Related Art

In order to keep pace with increasing Internet traffic, network operators have widely deployed optical fibers and optical transmission equipment, substantially increasing the capacity of backbone networks. A corresponding increase in access network capacity is also needed to meet the increasing bandwidth demand of end users for triple play services, including Internet protocol (IP) video, high-speed data, and packet voice. Even with broadband solutions, such as digital subscriber line (DSL) and cable modem (CM), the limited bandwidth offered by current access networks still presents a severe bottleneck in delivering large bandwidth to end users.

Among different competing technologies, passive optical networks (PONs) are one of the best candidates for nextgeneration access networks. With the large bandwidth of optical fibers, PONs can accommodate broadband voice, data, and video traffic simultaneously. Such integrated service is difficult to provide with DSL or CM technology. Furthermore, PONs can be built with existing protocols, such as Ethernet and ATM, which facilitate interoperability between PONs and other network equipment.

Typically, PONs are used in the "first mile" of the network, which provides connectivity between the service provider's central offices and the premises of the customers. The "first mile" is generally a logical point-to-multipoint network, where a central office serves a number of customers. For example, a PON can adopt a tree topology, wherein one trunk fiber couples the central office to a passive optical splitter/combiner. Through a number of branch fibers, the passive optical splitter/combiner divides and distributes downstream optical signals to customers and combines upstream optical signals from customers (see FIG. 1). Note that other topologies are also possible, including ring and mesh topologies.

Transmissions within a PON are typically performed between an optical line terminal (OLT) and optical network units (ONUs). The OLT controls channel connection, management, and maintenance, and generally resides in the central office. The OLT provides an interface between the PON and a metro backbone, which can be an external network belonging to, for example, an Internet service provider (ISP) or a local exchange carrier. For EPON, such interface is an Ethernet interface. The ONU terminates the PON and presents the native service interfaces to the end users, and can reside in the customer premise and couples to the customer's network through a customer-premises equipment (CPE).

FIG. 1 illustrates a passive optical network including a central office and a number of customers coupled through optical fibers and a passive optical splitter (prior art). A passive optical splitter 102 and optical fibers couple the customers to a central office 101. Multiple splitters can also be cascaded to provide the desired split ratio and a greater geographical coverage. Passive optical splitter 102 can reside near end-user locations to minimize the initial fiber deployment costs. Central office 101 can couple to an external network 103, such as a metropolitan area network operated by an ISP. Although FIG. 1 illustrates a tree topology, a PON can also be based on other topologies, such as a logical ring or a logical bus. Note that, although in this disclosure many examples are based on EPONs, embodiments of the present invention are not limited to EPONs and can be applied to a variety of PONs, such as ATM PONs (APONs), gigabit PONs (GPONs), and wavelength division multiplexing (WDM) PONs.

In conventional EPON configurations, at a carrier's central office, an OLT line card containing multiple OLTs can aggregate traffic from multiple downstream PONs, each communicating with an OLT. Multiple OLT line cards can be placed in a chassis to interface with the metro backbone via a backplane. To implement such a configuration, a carrier typically purchases custom-designed OLT line cards (based on the requirement of the traffic aggregation equipment and the metro backbone network) from equipment vendors. Such custom-designed OLT line cards can be expensive, and often require large amounts of capital expenditures (CAPEX) even during the initial network deployment stage. For example, each OLT line card includes a fixed number of OLT chips regardless of the number of existing subscribers. Therefore, when the number of subscribers is low, a large portion of the capacity of the OLT line card is wasted without generating revenue for the carrier. In addition, such an approach can also be cost ineffective for future upgrades as the number of subscribers increases.

SUMMARY

One embodiment provides an optical line terminal (OLT) module in a network device. The OLT module includes an optical signal module, an OLT management module, a scheduler module, and a forwarding module. The optical signal module transmits optical signals to and receives optical signals from a number of optical network units (ONUs). During operation, the OLT management module identifies a remote OLT module operating at a lower upstream data rate than the OLT module. The scheduler module identifies a report message received from a first ONU operating at the lower upstream data rate and generates a grant corresponding to the report message. A grant specifies a time slot for an upstream data burst. The scheduler module includes the grant in a notification frame destined for the remote OLT module. The forwarding module forwards the notification frame to an internal switch of the network device.

In a variation on this embodiment, the destination media access control (MAC) address of the remote OLT module is the destination MAC address of the notification frame.

In a variation on this embodiment, the notification frame further includes one or more of: an indicator indicating a type of a frame, and a virtual local area network (VLAN) tag.

In a variation on this embodiment, a data frame received via an upstream wavelength operating at the lower data rate is discarded at the OLT module.

In a variation on this embodiment, the optical signal module is an enhanced small form-factor pluggable (SFP+) transceiver, which includes a MAC layer.

In a variation on this embodiment, the upstream communication for the OLT module and the remote OLT module is via respective independent wavelengths. The OLT management module then identifies a gate message comprising a grant from the remote OLT module. The forwarding module forwards the grate message via a downstream wavelength.

In a variation on this embodiment, the scheduler module identifies a second report message received from a second ONU operating at the upstream data rate of the OLT module. In response, the scheduler module generates a second grant corresponding to the second report message and includes the second grant in a gate message destined for the second ONU.

In a variation on this embodiment, the upstream communication for the OLT module and the remote OLT module is via respective overlapping wavelengths. The forwarding module then forwards data frames received at the lower data rate and at the data rate of the OLT module to a first port of the internal switch.

In a variation on this embodiment, the scheduler module in the remote OLT module is disabled.

In a variation on this embodiment, the internal switch is configured to process the notification frame with a highest priority.

BRIEF DESCRIPTION OF THE FIGURES

In the figures, like reference numerals refer to the same figure elements.

DETAILED DESCRIPTION

Figure 1:
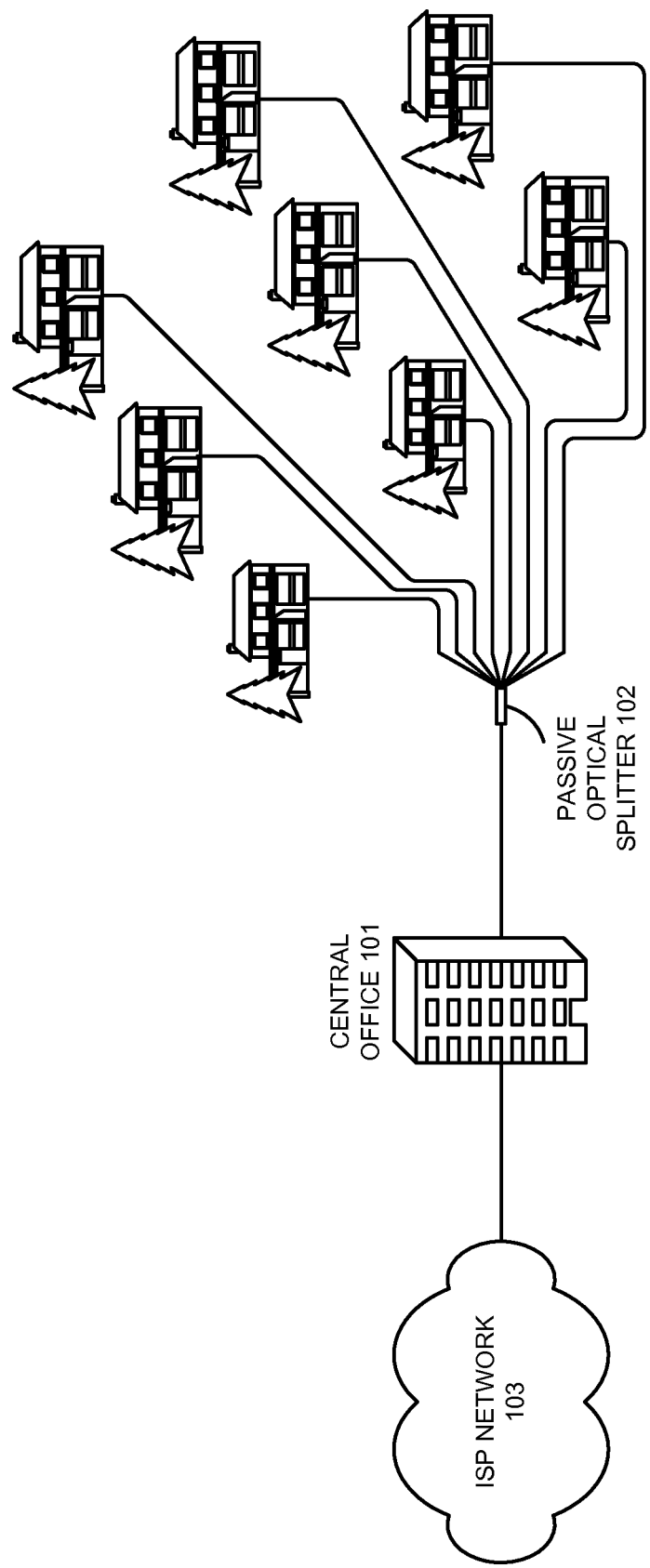
FIG. 1 illustrates an EPON wherein a central office and a number of subscribers are coupled through optical fibers and a passive optical splitter (prior art).

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention (e.g., general passive optical network (PON) architectures). Thus, the present invention is not intended to be limited to the embodiments shown, but is to be accorded the widest scope consistent with the principles and features disclosed herein.

Overview

In embodiments of the present invention, the problem of efficiently incorporating 1 Gigabits per second, or Gbps, (1G) and 10 Gbps (10G) support in an EPON system is solved by using individual enhanced small form-factor pluggable (SFP+) transceiver modules for 1G and 10G EPONs, respectively. With existing technologies, the architecture of an EPON system is usually designed to support coexistence even when it is not needed. In most cases, an operator deploys either a 1G or 10G EPON; and the coexistence of 1G and 10G EPONs on a single fiber is typically a transitional phase for the operator. However, to support this transitional phase, the optical module and media access control (MAC) chips in the EPON system are burdened with always supporting coexistence.

These optical modules are usually based on 10 Gigabit Small Form Factor Pluggable (XFP) XFP transceivers, which are large and can require more room than an SFP+ transceiver (e.g., up to twice the space needed by an SFP+ transceiver). Using of XFP transceivers limits the density of an EPON system since the density is limited by the width of the XFP transceivers. Moreover, coexistence of 1G and 10G EPONs leads to integrated MAC operations for both data rates. Hence, the optical performance of the upstream is degraded by the long signal from the optical transceiver to the Serializer/Deserializer (SERDES) in the MAC chip. Furthermore, to support an EPON, which uses an XFP transceiver, and point-to-point Ethernet, which uses SFP transceivers, the current architecture requires different line cards for these technologies.

The solution described herein to the above problems relies on using SFP+ transceivers in an EPON system. Since an SFP+ transceiver module can be more compact than an XFP transceiver module, the XFP transceiver module can be split into two smaller SFP+ transceiver modules: a 1G EPON OLT transceiver module and a 10G EPON OLT transceiver module. For networks with only 1G EPON ONUs, an EPON system can only be equipped with 1G EPON OLT transceiver modules. On the other hand, for networks with only 10G EPON ONUs, the EPON system can only be equipped with 10G EPON OLT transceiver modules. If coexistence is required, a 1G EPON OLT transceiver module and a 10G EPON OLT transceiver module, in conjunction with an optical splitter/combiner, allow the operator to provide a solution that an XFP transceiver module can provide.

EPON System Architecture

Figure 2A:
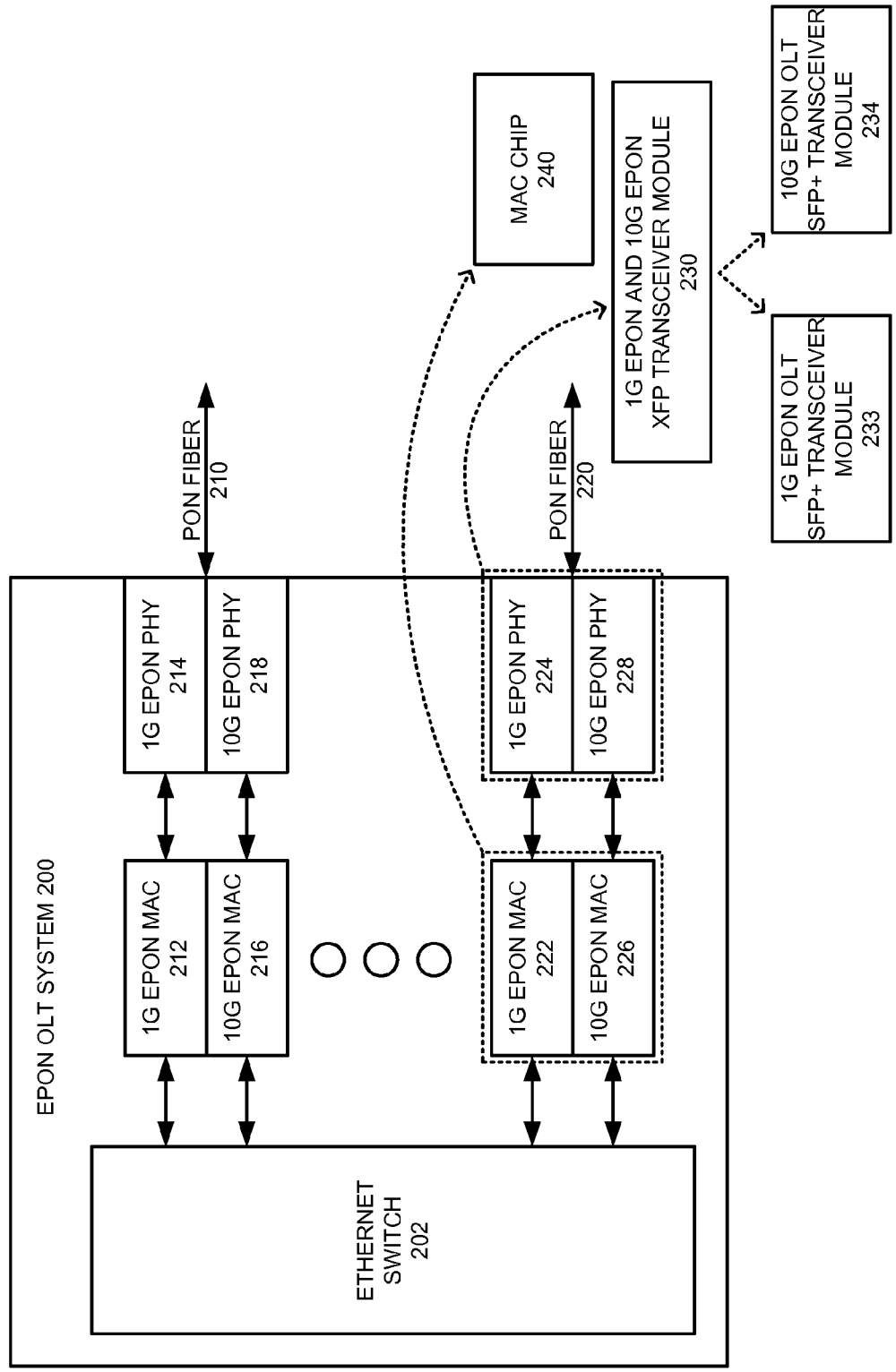
FIG. 2A illustrates an exemplary architecture of an EPON OLT system with enhanced small form-factor pluggable (SFP+) transceiver modules, in accordance with an embodiment of the present invention.

FIG. 2A illustrates an exemplary architecture of an EPON OLT system with SFP+OLT transceiver modules, in accordance with an embodiment of the present invention. EPON OLT system 200 includes an internal Ethernet switch 202, which forwards Ethernet frames between EPON modules, thereby facilitating internal communication among the EPON modules. Switch 202 can also be coupled to one or more external devices and forward Ethernet frames received from the EPON modules to these external devices. System 200 can be coupled with a plurality of PON fibers, including PON fibers 210 and 220, each of which serves an EPON segment.

A respective EPON segment can include an Institute of Electrical and Electronics Engineers (IEEE) 802.3 media access controller (MAC) layer, and an 802.3 physical (PHY) layer. For example, the EPON segment of PON fiber 210 includes, for 1G EPON, MAC layer 212 (e.g., in a MAC chip) and PHY layer 214 (e.g., a transceiver), and, for 10G EPON, MAC layer 216 and PHY layer 218. Similarly, the EPON segment of PON fiber 220 includes, for 1G EPON, MAC layer 222 and PHY layer 224, and, for 10G EPON, MAC layer 226 and PHY layer 228. Communication between MAC layers 222 and 226 can be via switch 202.

MAC layers 222 and 226 interface with 1G and 10G PHY layers 224 and 228, respectively. In the downstream direction, MAC layers 222 and 226 broadcast Ethernet traffic via 1G and 10G PHY layers 224 and 228, respectively. In the upstream direction, MAC layers 222 and 226 perform, in conjunction with each other, dynamic bandwidth allocation (DBA), which is used for arbitrating upstream traffic from various 1G and 10G ONUs. To support coexistence, MAC layers 222 and 226 can be integrated as a single MAC layer service. In addition, MAC layer 222 and 226 also perform forward error correction (FEC) in both downstream and upstream directions.

MAC layers 222 and 226 couple to the service provider's network via a number of interfaces in Ethernet switch 202. Examples of such an interface include, but are not limited to, Media Independent Interface (MII), Gigabit MII (GMII), 10 Gigabit MII (XGMII), and 10 Bit parallel Interface (TBI). System 200 can includes an embedded microprocessor that enables EPON management and control.

With existing technologies, to support coexistence, MAC layers 222 and 226 run in parallel in a single chip. Similarly, PHY layers 224 and 228 can run in parallel in a single XFP transceiver module 230. XFP transceiver module 230 provides transmitters for both 1G and 10G EPONs, and a receiver that supports 1G or 10G EPON. XFP transceiver module 230 can include a burst receiver and two continuous transmitters to support both 1G EPON and 10G EPON. Switch 202 can connect the EPON MAC chip with the uplink port. In some embodiments, a plurality of ports maybe included in a single MAC chip.

The architecture of system 200 is usually designed to support coexistence even when it is not needed. In most cases, an operator deploys either a 1G EPON or 10G EPON; and the coexistence of 1G and 10G EPONs on a single PON fiber, such as PON fiber 220, is typically a transitional phase for the operator. However, to support this transitional phase, system 200 is burdened with always supporting coexistence. Furthermore, XFP transceiver module 230 can be large and require more room than an SFP+ transceiver. Using XFP transceivers limits the density of system 200 since the density is limited by the width of the XFP transceivers. Moreover, coexistence of 1G and 10G EPONs leads to integrated MAC operations of MAC layers 222 and 226 in a MAC chip 240. Hence, the performance of the upstream via PON fiber 220 is limited by the serial signal from XFP transceiver module 230 to the SERDES in MAC chip 240.

To solve this problem, system 200 is equipped with SFP+ transceivers. For example, instead of running on XFP transceiver module 230, PHY layers 224 and 228 can run in SFP+ transceiver modules 233 and 234, respectively. Since SFP+ transceiver modules 233 and 234 are more compact than XFP transceiver module 230, XFP transceiver module 230 can be replaced by two smaller SFP+ transceiver modules: 1G EPON OLT SFP+ transceiver module 233 and a 10G EPON OLT SFP+ transceiver module 234.

For networks with only 1G ONUs, system 200 can only be equipped with 1G OLT transceiver modules (e.g., SFP+ transceiver module 233). With a single channel per optical module, SFP+ transceiver module 233 can individually support EPON functionalities of an EPON segment. Hence, operations of MAC layer 222, such as computing grants for upstream scheduling, can be integrated in SFP+ transceiver module 233. As a result, a separate MAC chip 240 may not be needed in system 200 and the limitation imposed by the SERDES in MAC chip 240 is improved. Similarly, for networks with only 10G ONUs, system 200 can only be equipped with 10G OLT transceiver modules (e.g., SFP+ transceiver module 234). Hence, operations of MAC layer 226 can be integrated in SFP+ transceiver module 234.

On the other hand, to support coexistence in a single PON fiber 220, 1G OLT SFP+ transceiver module 233 and 10G OLT SFP+ transceiver module 234 operate in conjunction with an optical splitter/combiner to facilitate coexistence in an EPON segment. Since MAC layers 222 and 226 are integrated with SFP+ transceiver modules 233 and 234, respectively, each of SFP+ transceiver modules 233 and 234 can facilitate OLT functionalities. If the wavelength carries (or wavelengths for short) of 1G and 10G upstream and downstream are independently operable (i.e. non-overlapping), SFP+ transceiver modules 233 and 234 can be independently operable as 1G and 10G OLTs in PON fiber 220. As a result, the schedulers in SFP+ transceiver modules 233 and 234 can individually generate grants for upstream scheduling for 1G and 10G ONUs, respectively.

However, the 1G and 10G EPON standards define an overlap between the 1G and 10G EPON upstream wavelengths. As a result, the schedulers in SFP+ transceiver modules 233 and 234 may not individually generate grants for upstream scheduling for 1G and 10G ONUs, respectively. To solve this problem, only the scheduler in SFP+ transceiver module 234 can generate grants for upstream scheduling for both 1G and 10G ONUs and the scheduler in SFP+ transceiver module 233 can remain disabled. In other words, the scheduler in SFP+ transceiver module 233 is precluded from generating a grant. The scheduler in SFP+ transceiver module 234 can generate the grants using Time-Division-Multiple-Access (TDMA) scheduling to isolate the upstream bursts from 1G and 10G ONUs. In an upstream time slot for a 1G ONU, the burst is sent at 1 Gbps, and in a time slot for a 10G ONU, the burst is sent at 10 Gbps. Switch 202 can forward the grants for 1G ONUs from SFP+ transceiver module 234 to SFP+ transceiver module 233, which, in turn, forwards the grants via its 1G downstream (i.e., via the wavelength used for 1 Gbps downstream communication).

With independent (i.e., non-overlapping) upstream wavelengths, suppose that an ONU served by system 200 operates in an asymmetric mode in which the downstream and upstream data rates of the ONU are 10 Gbps and 1 Gbps, respectively. As a result, the scheduler in SFP+ transceiver module 233 cannot forward a GATE message comprising a grant for the ONU via its 1G downstream. To solve this problem, SFP+ transceiver module 233 forwards the GATE message to switch 202. Switch 202 identifies the MAC address of the ONU to be reachable via the port coupling SFP+ transceiver module 234 and forwards the GATE message via the port. Upon receiving, SFP+ transceiver module 234 forwards the GATE message via its 10G downstream.

If a switch supports both EPON and point-to-point Ethernet, both of which can be based on fiber links, the current architecture requires different line cards for these technologies. For example, to support EPON, the switch uses an EPON MAC chip and an XFP transceiver, and to support point-to-point Ethernet, the switch uses an SFP transceiver and doesn't use an EPON MAC chip. However, if an EPON OLT can be implemented using an SFP+ transceiver module with an embedded MAC chip, a switch can provide both types of communications using a single type of transceiver socket.

Figure 2B:
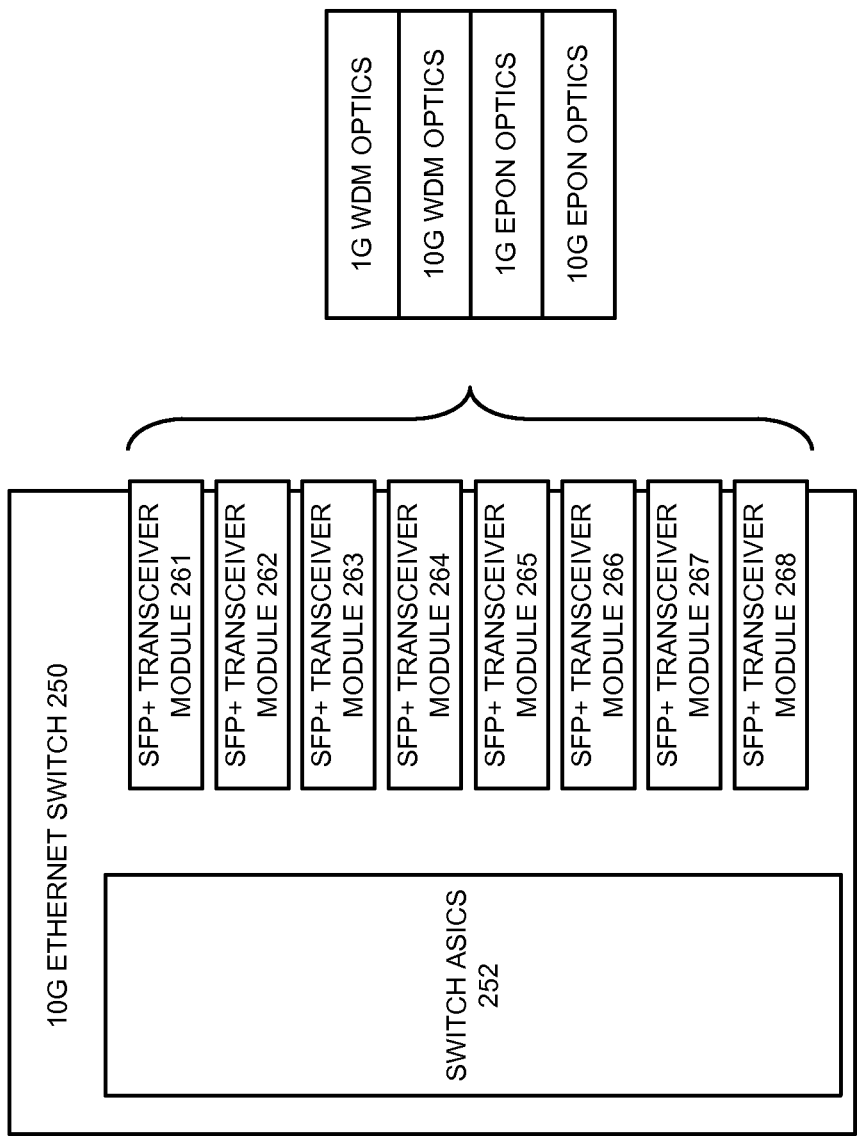
FIG. 2B illustrates exemplary optics options for a switch with SFP+ transceiver modules, in accordance with an embodiment of the present invention.

FIG. 2B illustrates exemplary optics options for a switch with SFP+ transceiver modules, in accordance with an embodiment of the present invention. In this example, a 10G Ethernet switch 250 includes switch ASICs 252, which facilitates switching of frames in switch 250. Furthermore, switch 250 includes a number of SFP+ transceiver modules 261-268. Optics option for a respective SFP+ transceiver module in switch 250 include both 1G and 10G Wavelength-division multiplexing (WDM) (e.g., point-to-point Ethernet), and 1G and 10G EPONs.

More specifically, since point-to-point communication over a WDM channel can be done simply by forwarding traffic over a fiber link, a SFP+ transceiver module can readily facilitate point-to-point connectivity. On the other hand, with a single channel per SFP+ transceiver module, MAC functionality can be integrated with a SFP+ transceiver module. As a result, the SFP+ transceiver module can operate as a 1G or 10G EPON OLT. The single channel can rely on switch 250 to perform traffic management and switching to the ports of switch 250. In this way, a low cost, high volume, and high density switch 250 supports EPON segments in addition to point-to-point connections.

Scheduling

Figure 3A:
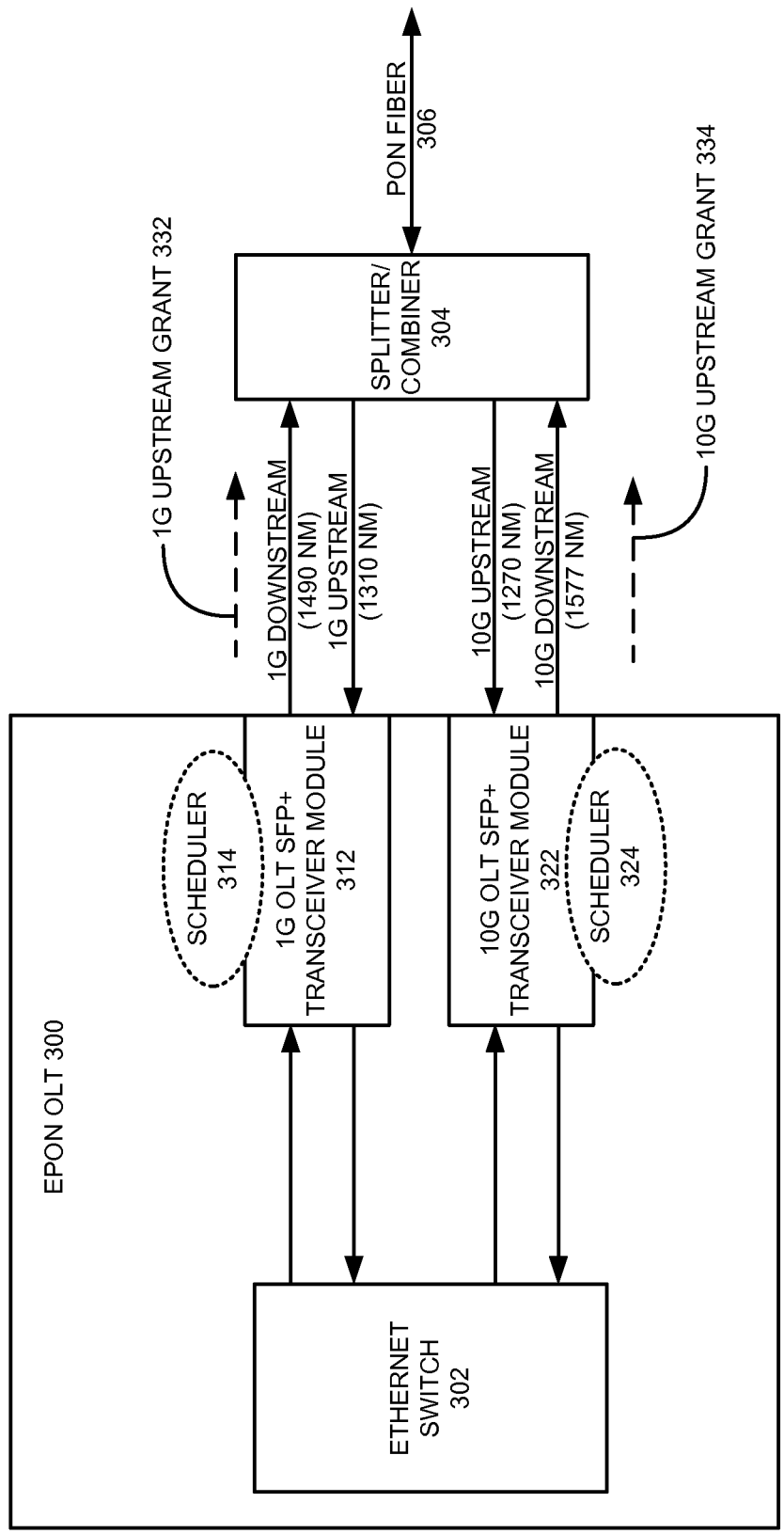
FIG. 3A illustrates an exemplary scheduling of an EPON OLT with 1G and 10G OLT SFP+ transceiver modules operating on individual wavelengths, in accordance with an embodiment of the present invention.

FIG. 3A illustrates an exemplary scheduling of an EPON OLT with 1G and 10G OLT SFP+ transceiver modules operating on individual wavelengths, in accordance with an embodiment of the present invention. An EPON OLT 300 includes a 1G OLT SFP+ transceiver module 312 and a 10G OLT SFP+ transceiver module 322. SFP+ transceiver modules 312 and 322 can support both PHY and MAC layers. EPON OLT 300 further includes Ethernet switch 302, which facilitates frame forwarding between SFP+ transceiver modules 312 and 322.

Downstream communication for 1G and 10G EPONs can be carried over 1490 nm and 1577 nm wavelength carries, respectively; and upstream communication for 1G and 10G EPONs can be carried over 1310 nm and 1270 nm wavelength carries, respectively. SFP+ transceiver modules 312 and 322 can independently operate as 1G and 10G EPON OLTs, respectively, over PON fiber 306. To support coexistence in a PON fiber 306, SFP+ transceiver modules 312 and 322 operate in conjunction with an optical splitter/combiner 304. Since SFP+ transceiver modules 322 and 324 operate on independent wavelengths, splitter/combiner 304 can combine or split the corresponding wavelengths on PON fiber 306.

Schedulers 314 and 324 in SFP+ transceiver modules 312 and 322, respectively, can individually generate grants for upstream scheduling for 1G and 10G EPON ONUs, respectively. In this way, SFP+ transceiver modules 312 and 322 facilitate a distributed transceiver architecture for an EPON. During operation, SFP+ transceiver module 312 receives a REPORT message, which indicates the number of bytes requested by a respective priority queue (e.g., a queue for priority-based flow control, such as an IEEE 802.1Q queue), from a 1G ONU. Scheduler 314 calculates a grant 332 accordingly and includes grant 332 in a GATE message. SFP+ transceiver module 312 transmits the GATE message via its 1G downstream. Similarly, upon receiving a REPORT message from a 10G ONU, scheduler 324 calculates a grant 334 accordingly and includes grant 334 in a GATE message. SFP+ transceiver module 322 transmits the GATE message via its 10G downstream.

Figure 3B:
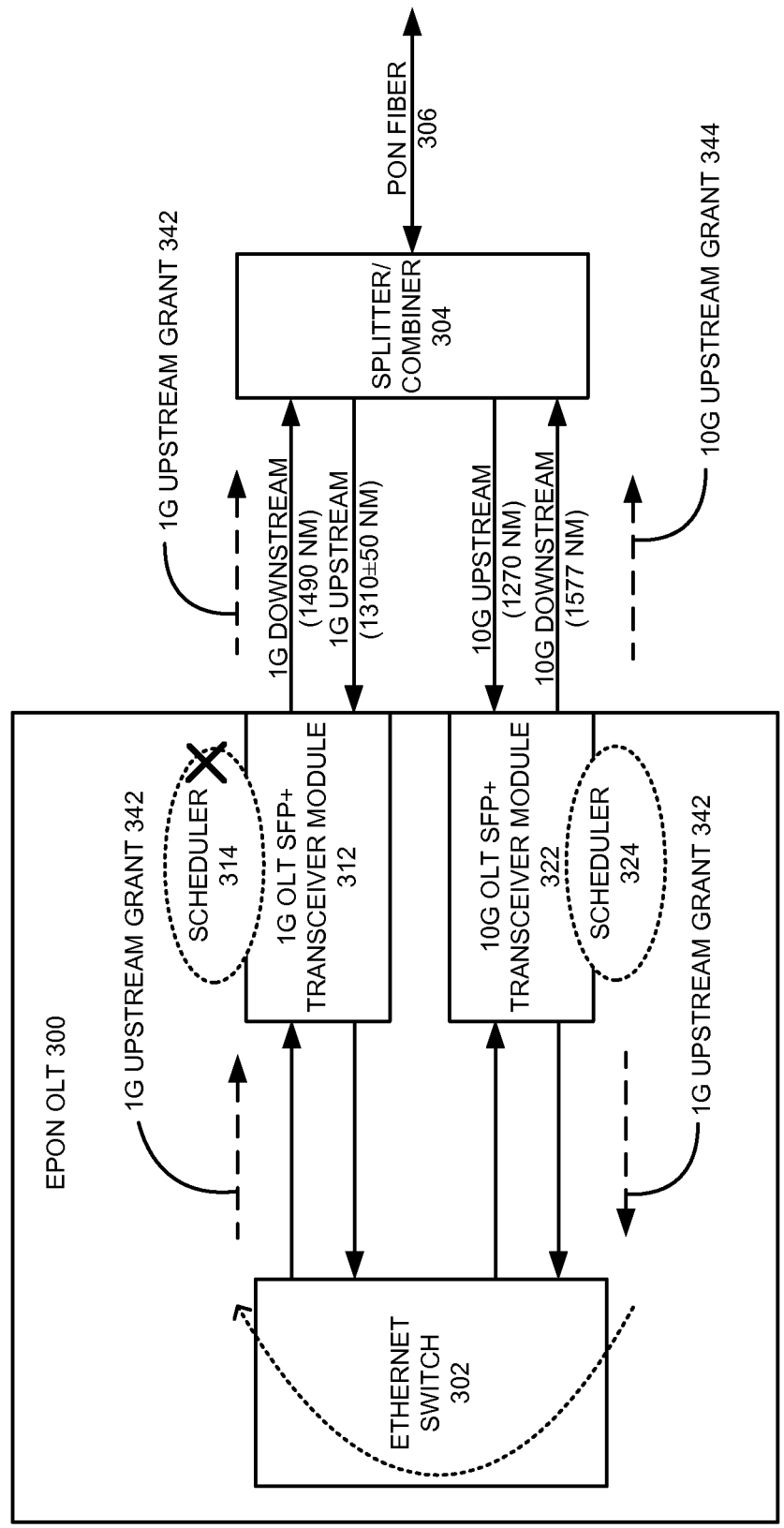
FIG. 3B illustrates an exemplary scheduling of an EPON OLT with 1G and 10G OLT SFP+ transceiver modules operating on overlapping wavelengths, in accordance with an embodiment of the present invention.

FIG. 3B illustrates an exemplary scheduling of an EPON OLT with 1G and 10G OLT SFP+ transceiver modules operating on overlapping wavelengths, in accordance with an embodiment of the present invention. Based on the original 1G EPON standard, the 1310 nm wavelength width can be ±50 nm, which can cause an overlap between the 1G and 10G EPON upstream wavelengths. As a result, schedulers 314 and 324 may not individually generate grants for upstream scheduling for 1G and 10G EPON ONUs, respectively.

To solve this problem, only scheduler 324 in SFP+ transceiver module 322 can generate grants for upstream scheduling for both 1G and 10G EPON ONUs and scheduler 314 in SFP+ transceiver module 312 can remain disabled (denoted with a cross sign). However, the grants to the ONUs should reach the appropriate downstream transmitter. For a 10G ONU, scheduler 324 generates a grant 344, includes grant 344 in a corresponding GATE message for the ONU, and transmit the GATE message via its 10G downstream to the ONU. It should be noted that the 10G ONU can have either a 1G or a 10G upstream.

For a 1G ONU, scheduler 324 generates a grant 342 and includes grant 342 in a notification frame. SFP+ transceiver module 322 sets the MAC address of SFP+ transceiver module 312 as the destination MAC address of the notification frame. SFP+ transceiver module 322 can also include an Ethertype indicating an Ethernet protocol type facilitating the internal forwarding of the frame, and/or a virtual local area network (VLAN) tag to the notification frame. SFP+ transceiver module 322 then transmits the notification frame to switch 302, which, in turn, forwards the notification frame to SFP+ transceiver module 312. Switch 302 can be configured to process and forward a notification frame carrying a grant with a highest priority. Upon receiving the notification fame, SFP+ transceiver module 312 obtains grant 342 from the notification fame and includes grant 342 in a GATE message for the ONU. SFP+ transceiver module 312 can generate a downstream timestamp for the GATE message to match the actual transmit time.

It should be noted that SFP+ transceiver module 312 should be aware of the timing and source for upstream bursts. To get this information, SFP+ transceiver module 312 can capture the grant information from the GATE messages. Furthermore, SFP+ transceiver module 322 can be configured with a slightly longer loop time (e.g., the time between transmitting a downstream GATE message and receiving a corresponding upstream burst). A maximum possible delay through switch 302 should be added to this loop time.

SFP+ transceiver module 322 can receive both 1G and 10G upstream bursts. An upstream burst can include both data frames and REPORT messages. On the other hand, SFP+ transceiver module 312 can only receive the 1G upstream bursts. SFP+ transceiver module 322 discards the data frames from 1G ONUs. However, SFP+ transceiver module 322 captures a respective REPORT message from both 1G and 10G ONUs. SFP+ transceiver modules 312 and 322 receive downstream traffic for 1G and 10G ONUs, respectively. Since scheduler 314 is disabled, SFP+ transceiver module 312 discards the REPORT messages. Though SFP+ transceiver module 312 can receive the REPORT messages from its 1G upstream and forward the frames to scheduler 324 in SFP+ transceiver module 322 through switch 302, such forwarding can increase the round trip time and lower the performance.

If an ONU operates in the asymmetric mode, the downstream and upstream data rates of the ONU are 10 Gbps and 1 Gbps, respectively. SFP+ transceiver module 322 does not discard the data frames from the ONU. In other words, SFP+ transceiver module 312 does not maintain a connectivity with such an ONU. This ensures that upstream bursts from the ONU are received by SFP+ transceiver module 322 and forwarded to switch 302. As a result, switch 302 receives both 10G downstream and 1G upstream traffic via the same switch port coupling SFP+ transceiver module 322, and learns the MAC address of the ONU from the switch port. This can prevent MAC address oscillation and facilitates consistent forwarding of traffic to the ONU.

Table 1 shows the types of frames SFP+ transceiver modules 312 and 322 process for different ONU types.

TABLE 1

Data frame types processed by SFP+ transceiver modules for different ONU types

|  | 1 G ONU | 10 G ONU | Asymmetric ONU |
|---|---|---|---|
| 1 G OLT SFP+ transceiver module 312 | Upstream: Data Downstream: Data and GATE (from switch 302) | No Connectivity | No Connectivity |
| 10 G OLT SFP+ transceiver module 322 | Upstream: REPORT | Upstream: Data and REPORT Downstream: Data and GATE | Upstream: Data and REPORT Downstream: Data and GATE |

Figure 3C:
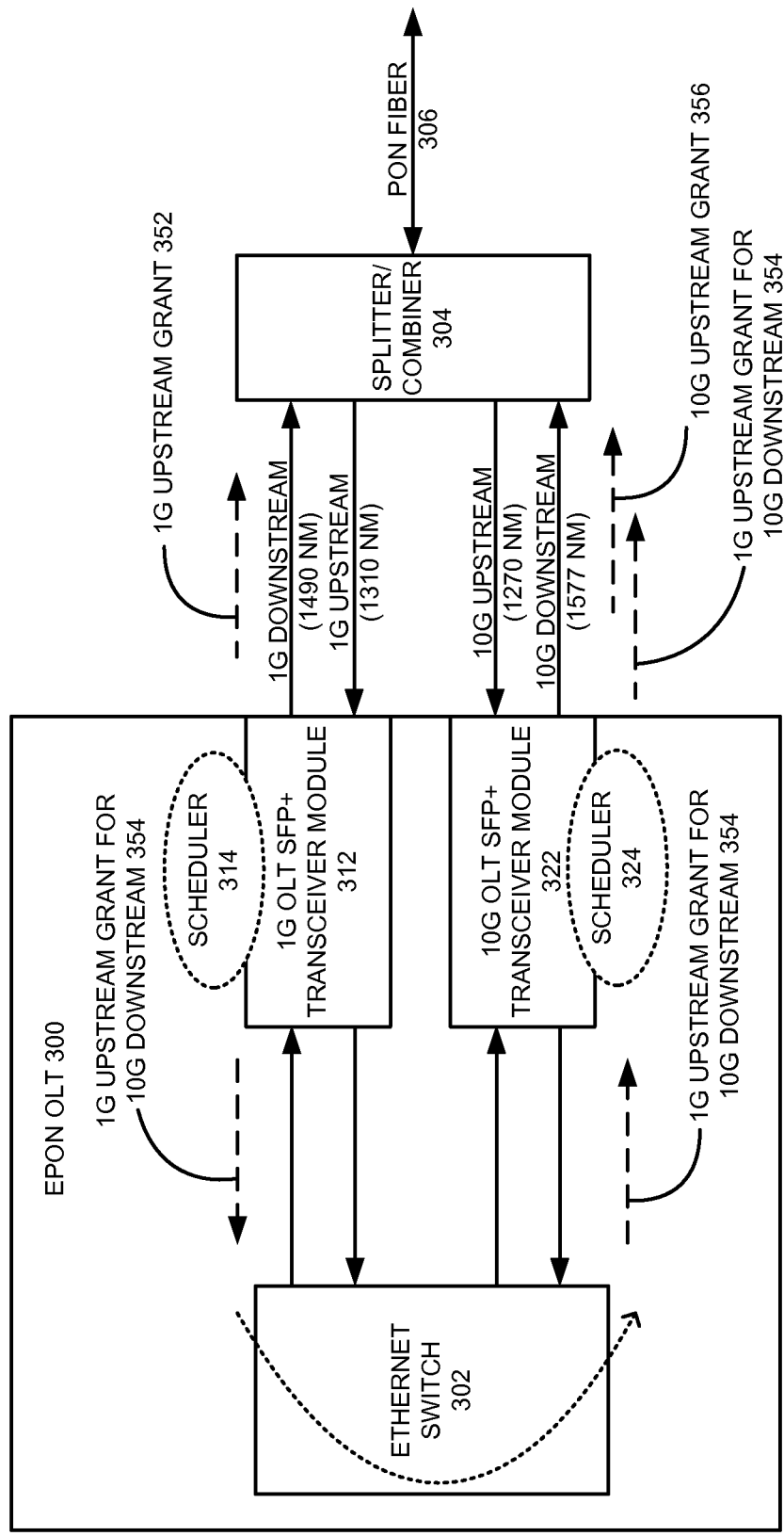
FIG. 3C illustrates an exemplary scheduling of an EPON OLT with 1G and 10G OLT SFP+ transceiver modules operating on individual wavelengths for an asymmetric ONU, in accordance with an embodiment of the present invention.

FIG. 3C illustrates an exemplary scheduling of an EPON OLT with 1G and 10G OLT SFP+ transceiver modules operating on individual wavelengths for an asymmetric ONU, in accordance with an embodiment of the present invention. With independent upstream wavelengths (i.e., without the overlap), both schedulers 314 and 324 are operational. Upon receiving a REPORT message from a 10G ONU, scheduler 324 can generate a grant 356 for the 10G ONU and include grant 356 in a GATE message. SFP+ transceiver module 322 forwards the GATE message via its 10G downstream.

On the other hand, upon receiving a REPORT message from the asymmetric ONU, scheduler 314 can generate a grant 354 for the asymmetric ONU and include grant 356 in a GATE message. Since the downstream for the asymmetric ONU is 10G, scheduler 314 cannot forward the GATE message via its 1G downstream. To solve this problem, SFP+ transceiver module 312 forwards the GATE message to switch 302. Switch 302 identifies the MAC address of the asymmetric ONU to be reachable via the port coupling SFP+ transceiver module 322 and forwards the GATE message via the port. Upon receiving, SFP+ transceiver module 322 forwards the GATE message via its 10G downstream.

Operations

Figure 4A:
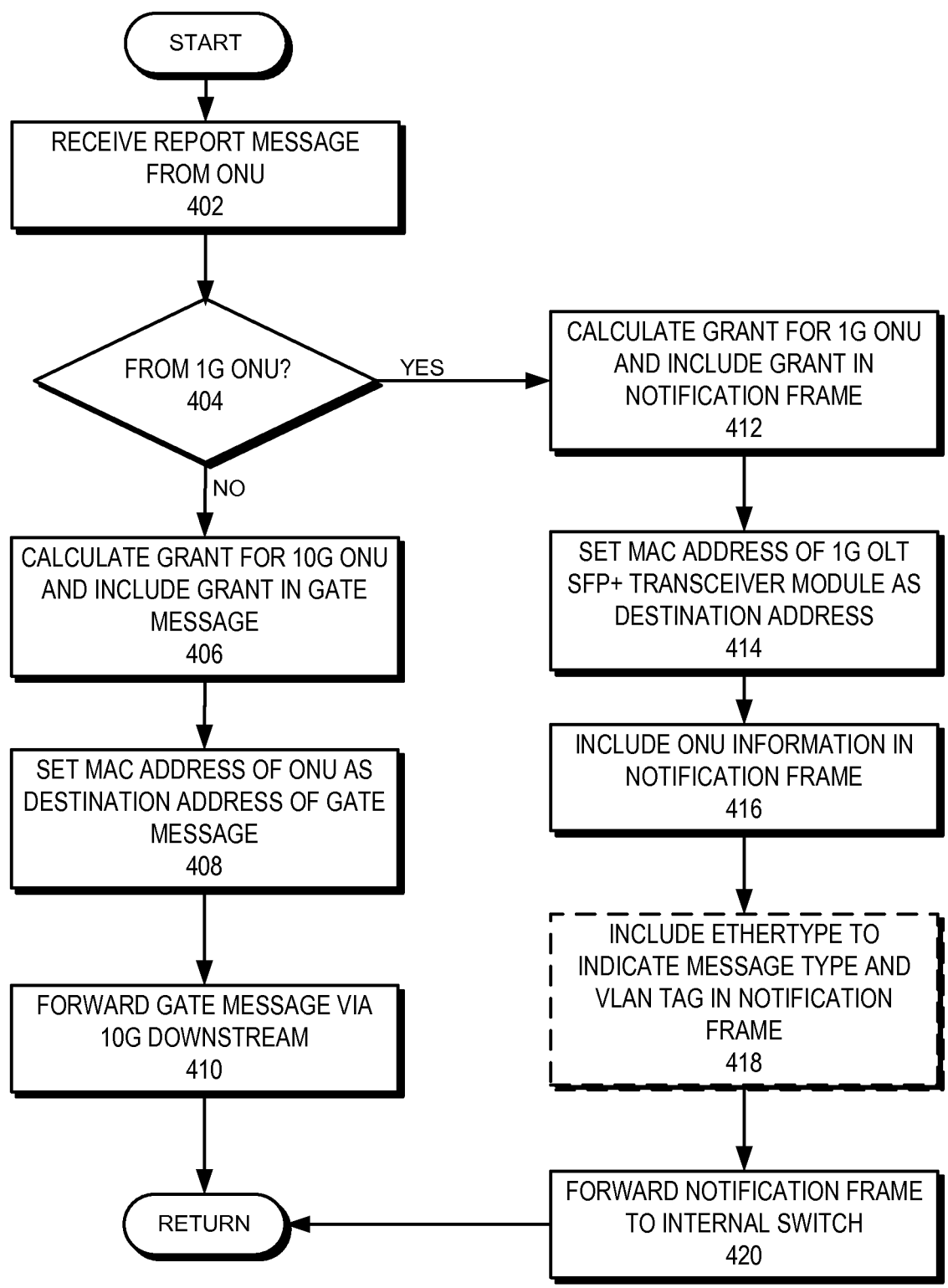
FIG. 4A presents a flowchart illustrating the process of a 10G OLT SFP+ transceiver module generating grants for overlapping 1G and 10G upstreams, in accordance with an embodiment of the present invention.

FIG. 4A presents a flowchart illustrating the process of a 10G OLT SFP+ transceiver module generating grants for overlapping 1G and 10G upstreams, in accordance with an embodiment of the present invention. The 10G OLT SFP+ transceiver module can be in an EPON system, which can include a 1G OLT SFP+ transceiver module and an internal switch. During operation, upon receiving a REPORT message from an ONU (operation 402), the module checks whether the REPORT message is from a 1G ONU (operation 404). If the message is not from a 1G ONU, the message is from a 10G ONU. The module then calculates a grant for the 10G ONU (i.e., for a 10 Gbps upstream data rate) and includes the grant in a GATE message (operation 406). The module sets the MAC address of the ONU as the destination address of the GATE message (operation 408) and forwards the GATE message via its 10G downstream (operation 410).

If the message is for a 1G ONU, the module calculates a grant for the 1G ONU and includes the grant in a notification frame (operation 412). This notification frame can be an Ethernet frame. The module sets the MAC address of the 1G OLT SFP+ transceiver module as the destination address of the notification frame (operation 414) and includes the ONU information in the notification frame (operation 416). The module can, optionally, include an Ethertype to indicate a message type and a VLAN tag in the notification frame (operation 418). The module then forwards the notification message to the internal switch (operation 420).

Figure 4B:
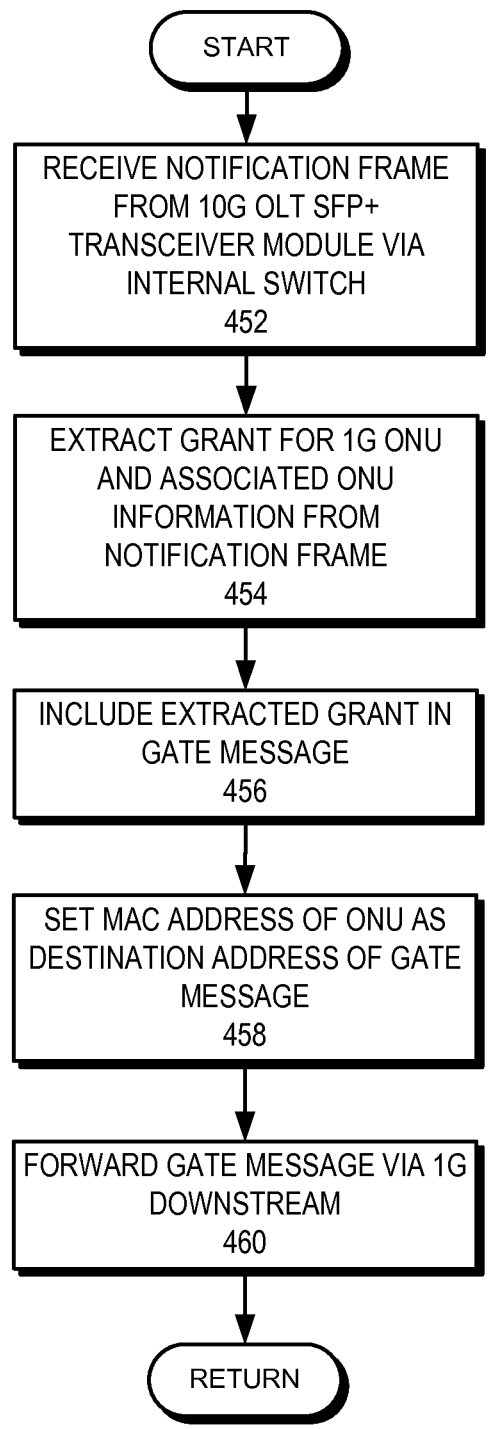
FIG. 4B presents a flowchart illustrating the process of a 1G OLT SFP+ transceiver module forwarding grants for 1G upstream overlapping with 10G upstream, in accordance with an embodiment of the present invention.

FIG. 4B presents a flowchart illustrating the process of a 1G OLT SFP+ transceiver module forwarding grants for 1G upstream overlapping with 10G upstream, in accordance with an embodiment of the present invention. The 1G OLT SFP+ transceiver module can be in an EPON system, which can include a 10G OLT SFP+ transceiver module and an internal switch. During operation, the module receives a notification frame from the 10G OLT SFP+ transceiver module via the internal switch (operation 452) and extracts a grant for a 1G ONU and associated ONU information from the notification frame (operation 454). The module includes the extracted grant in a GATE message (operation 456), sets the MAC address of the ONU as the destination address of the GATE message (operation 458), and forwards the GATE message via its 1G downstream (operation 460).

Figure 5A:
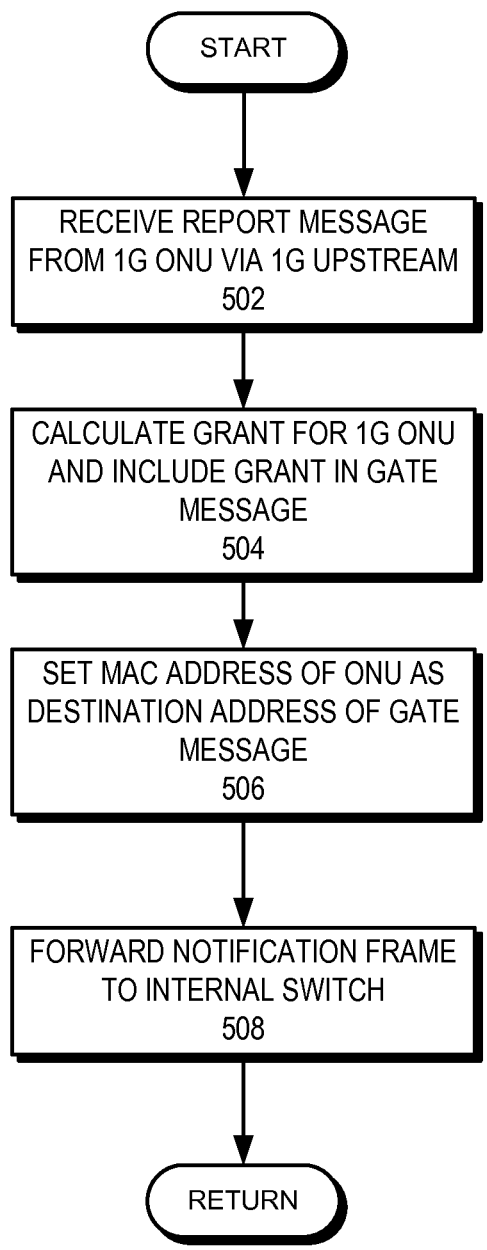
FIG. 5A presents a flowchart illustrating the process of a 1G OLT SFP+ transceiver module generating grants for 1G upstream and forwarding via 10G OLT SFP+ transceiver module, in accordance with an embodiment of the present invention.

FIG. 5A presents a flowchart illustrating the process of a scheduler in a 1G OLT SFP+ transceiver module generating grants for 1G upstream and forwarding via 10G OLT SFP+ transceiver module, in accordance with an embodiment of the present invention. The 1G and 10G OLT SFP+ transceiver modules can be in an EPON system, which can include an internal switch. During operation, upon receiving a report message from a 1G ONU via its 1G upstream (operation 502), the module calculates a grant for the 1G ONU and includes the grant in a GATE message (operation 504). The module sets the MAC address of the ONU as the destination address of the GATE message (operation 506) and forwards the GATE message to the internal switch (operation 508).

Figure 5B:
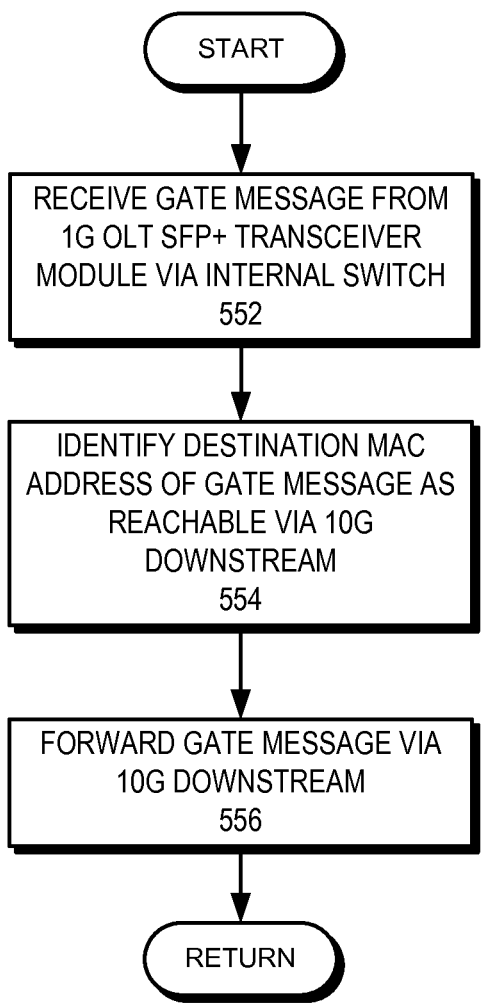
FIG. 5B presents a flowchart illustrating the process of a 10G OLT SFP+ transceiver module forwarding a 1G upstream grant received from a scheduler in a 1G OLT SFP+ transceiver module, in accordance with an embodiment of the present invention.

FIG. 5B presents a flowchart illustrating the process of a 10G OLT SFP+ transceiver module forwarding a 1G upstream grant received from a scheduler in a 1G OLT SFP+ transceiver module, in accordance with an embodiment of the present invention. The 1G and 10G OLT SFP+ transceiver modules can be in an EPON system, which can include an internal switch. During operation, the module receives a GATE message from the 1G OLT SFP+ transceiver module via the internal switch (operation 552). The module identifies the destination MAC address of the GATE message as reachable via 10G downstream (operation 554) and forwards the GATE message via its 10G downstream (operation 456).

OLT Line Card

Figure 6:
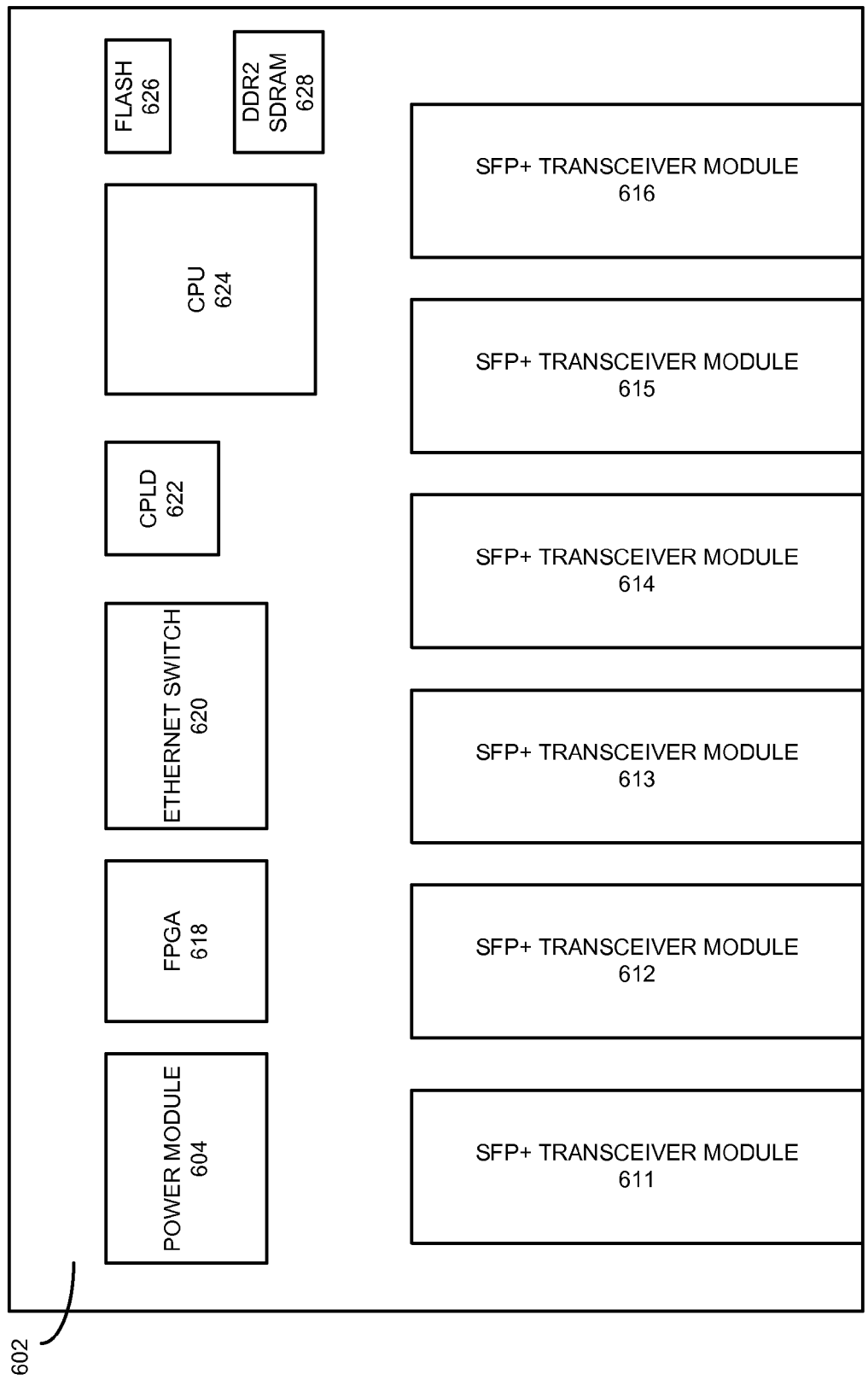
FIG. 6 presents a diagram illustrating the architecture of an exemplary OLT system with SFP+ transceiver modules, in accordance with an embodiment of the present invention.

FIG. 6 presents a diagram illustrating the architecture of an exemplary OLT system with SFP+ transceiver modules, in accordance with an embodiment of the present invention. OLT system 600 includes a line card 602 and a number of OLT modules including SFP+ transceiver modules 611-616. Line card 602 can be a standard Ethernet line card fabricated by any equipment vendor. To be able to interface with SFP+ transceiver modules 611-616, line card 602 includes corresponding SFP+ transceiver interfaces and slots.

OLT system 600 also includes a power module 604, a field-programmable gate array (FPGA) module 618, an Ethernet switch 620, a complex programmable logic device (CPLD) module 622, a central processing unit (CPU) 624, a flash memory 626, and a DDR2 SDRAM 628. It should be noted that a respective SFP+ transceiver module, such as SFP+ transceiver module 611, can operate as an OLT for an EPON segment, and can include one or more of: an SFP+ transceiver, a management controller, a scheduler, and a data frame forwarder (not shown in FIG. 6).

Power module 604 receives external power and provides power to OLT system 600. Ethernet switch 620 provides standard switch functionality, including aggregating traffic from all coupled Ethernet ports which are coupled to SFP+ transceiver modules 611-616. Programmable logic, including FPGA module 618 and CPLD module 622, enables control and management of OLT system 600. CPU 624 manages local components on OLT system 600, aggregates management and control signals from SFP+ transceiver modules 611-616, and communicates with a routing engine located on the chassis. In one embodiment, CPU 624 configures SFP+ transceiver modules 611-616. Flash memory 626 stores the programs and the initial boot-up configurations for CPU 624. DDR2 SDRAM 628 can provide memory space for CPU 624 processing and/or data frame buffering.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An optical line terminal (OLT) module in a network device, comprising:
    an optical signal module configured to transmit optical signals to and receive optical signals from a number of optical network units (ONUs);
    an OLT management module configured to identify a remote OLT module operating at a lower upstream data rate than the OLT module;
    a scheduler module configured to:
        identify a report message received from a first ONU operating at the lower upstream data rate;
        generate a grant corresponding to the report message, wherein a grant specifies a time slot for an upstream data burst;
        include the grant in a notification frame destined for the remote OLT module; and
    a forwarding module configured to forward the notification frame to an internal switch coupled to the OLT module, wherein the internal switch is in the network device.

2. The OLT module of claim 1, wherein the destination media access control (MAC) address of the remote OLT module is the destination MAC address of the notification frame.

3. The OLT module of claim 1, wherein the notification frame further includes one or more of: an indicator indicating a type of a frame, and a virtual local area network (VLAN) tag.

4. The OLT module of claim 1, wherein a data frame received via an upstream wavelength operating at the lower data rate is discarded at the OLT module.

5. The OLT module of claim 1, wherein the optical signal module is an enhanced small form-factor pluggable (SFP+) transceiver, and wherein the SFP+ transceiver includes a MAC layer.

6. The OLT module of claim 1, wherein upstream communication for the OLT module and the remote OLT module is via respective independent wavelengths;
    wherein the OLT management module is further configured to identify a gate message from the remote OLT module, wherein the gate message includes a grant; and
    wherein the forwarding module is further configured to forward the gate message via a downstream wavelength.

7. The OLT module of claim 1, wherein the scheduler module is further configured to:
    identify a second report message received from a second ONU operating at upstream data rate of the OLT module;
    generate a second grant corresponding to the second report message; and
    include the second grant in a gate message destined for the second ONU.

8. The OLT module of claim 1, wherein upstream communication for the OLT module and the remote OLT module is via respective overlapping wavelengths; and
    wherein the forwarding module is further configured to:
        forward a data frame received at the lower data rate to a first port of the internal switch; and
        forward a data frame received at the data rate of the OLT module to the first port of the internal switch.

9. The OLT module of claim 1, wherein a scheduler module in the remote OLT module is disabled.

10. The OLT of claim 1, wherein the internal switch is configured to process the notification frame with a highest priority.

11. A method implemented in an optical line terminal (OLT) module in a network device, comprising:
    transmitting optical signals to and receiving optical signals from a number of optical network units (ONUs);
    identifying a remote OLT module operating at a lower upstream data rate than the OLT module;
    identifying a report message received from a first ONU operating at the lower upstream data rate;
    generating a grant corresponding to the report message, wherein a grant specifies a time slot for an upstream data burst;
    including the grant in a notification frame destined for the remote OLT module; and
    forwarding the notification frame to an internal switch coupled to the OLT module, wherein the internal switch is in the network device.

12. The method of claim 11, wherein the destination media access control (MAC) address of the remote OLT module is the destination MAC address of the notification frame.

13. The method of claim 11, wherein the notification frame further includes one or more of: an indicator indicating a type of a frame, and a virtual local area network (VLAN) tag.

14. The method of claim 11, wherein a data frame received via an upstream wavelength operating at the lower data rate is discarded at the OLT module.

15. The method of claim 11, wherein optical signals are transmitted from an enhanced small form-factor pluggable (SFP+) transceiver, and wherein the SFP+ transceiver includes a MAC layer.

16. The method of claim 11, wherein upstream communication for the OLT module and the remote OLT module is via respective independent wavelengths;
    wherein the method further comprises:

identifying a gate message from the remote OLT module; and forwarding the grate message via a downstream wavelength.

17. The method of claim 11, further comprising:

identifying a second report message received from a second ONU operating at upstream data rate of the OLT module;

generating a second grant corresponding to the second report message; and including the second grant in a gate message destined for the second ONU.

18. The method of claim 11, wherein upstream communication for the OLT module and the remote OLT module is via respective overlapping wavelengths; and wherein the method further comprises:

forwarding a data frame received at the lower data rate to a first port of the internal switch; and forwarding a data frame received at the data rate of the OLT module to the first port of the internal switch.

19. The method of claim 11, further comprising precluding the remote OLT module from generating a grant.

20. The method of claim 11, wherein the internal switch is configured to process the notification frame with a highest priority.

21. A network device, comprising:

a line card;

an internal switch in the network device; and a pluggable optical line terminal (OLT) module plugged into the network device, the OLT module comprising:

a optical signal module configured to transmit optical signals to and receive optical signals from a number of optical network units (ONUs);

an OLT management module configured to identify a remote OLT module operating at a lower upstream data rate than the OLT module;

a scheduler module configured to:

identify a report message received from a first ONU operating at the lower upstream data rate;

generate a grant corresponding to the report message;

include the grant in a notification frame destined for the remote OLT module; and a forwarding module configured to forward the notification frame to the internal switch coupled to the OLT module.

* * * * *